United States Patent [19]

Carr

[11] 4,093,510

[45] June 6, 1978

[54] XANTHATED STARCH AMINE PAPER ADDITIVES

[75] Inventor: Merle E. Carr, Chillicothe, Ill.

[73] Assignee: The United States of America as represented by the Secretary of Agriculture, Washington, D.C.

[21] Appl. No.: 785,616

[22] Filed: Apr. 7, 1977

[51] Int. Cl.$^2$ .............................................. D21D 3/00
[52] U.S. Cl. ....................................... 162/175; 536/49
[58] Field of Search ...................... 162/175; 536/48, 49; 106/210, 213

[56] References Cited

U.S. PATENT DOCUMENTS

| | | | |
|---|---|---|---|
| 3,336,144 | 8/1967 | Bridgeford et al. | 106/164 |
| 3,459,632 | 8/1969 | Caldwell | 162/175 |
| 3,467,647 | 9/1969 | Benninga | 536/114 |
| 3,562,103 | 2/1971 | Moser et al. | 162/175 |
| 3,649,624 | 3/1972 | Powers et al. | 536/50 |
| 3,790,514 | 2/1974 | Economou | 260/17.4 ST |
| 3,793,310 | 2/1974 | Elizer | 536/49 |

*Primary Examiner*—S. Leon Bashore
*Assistant Examiner*—Peter Chin
*Attorney, Agent, or Firm*—M. Howard Silverstein; David G. McConnell; Curtis P. Ribando

[57] ABSTRACT

Novel amphoteric starch derivatives, xanthated starch amines, have been employed as wet-end paper additives for improving both wet and dry strength. They are easily repulpable, readily biodegradable, effective in a broad range of furnish pH's, and are competitive on a cost/performance basis with commercial systems.

17 Claims, No Drawings

XANTHATED STARCH AMINE PAPER ADDITIVES

BACKGROUND OF THE INVENTION

1. Field of the Invention

This invention relates to novel amphoteric starch derivatives and their application as wet-end additives for improving both wet and dry strength of paper.

2. Description of the Prior Art

Commercial wet-strength paper additives, which include polyamide-polyamine-epichlorohydrin (PAE), urea-formaldehyde (UF), malamine-formaldehyde (MF), polyethylenimine (PEI), modified polyacrylamide, and similar resins, are derived from diminishing reserves of petroleum and natural gas products and/or high energy processes. They are thereby rapidly becoming economically impractical. Moreover, these resins generally cause difficulty in paper repulping processes and are not readily biodegradable, thereby being ecologically undesirable.

In some cases, neutral to alkaline pH papermaking systems are required to improve properties such as interfiber bonding, stability of paper on aging, retention of alkaline fillers, and paper softness. However, except for PAE, the above-mentioned commercial wet-strength resins function marginally unless the pH of the paper-making systems are in the range of about 4.5–5.5. These acidic conditions of course contribute to equipment corrosion and increased maintenance costs.

The principal industrial wet-end dry-strength paper additives are the cationic starches. Exemplary of these are the starch ethers containing tertiary and quaternary amines as taught in U.S. Pat. Nos. 2,813,093 (Caldwell et al.) and 2,876,217 (Paschall), and also sulfonium and phosphonium starch derivatives as described in U.S. Pat. Nos. 2,989,520 (Rutenberg et al.) and 3,077,469 (Aszalos), respectively. Cationic starches do not improve paper wet strength, and frequently their effectiveness is significantly reduced when furnish pH is appreciably above 5.5, particularly for the tertiary amines.

When both wet- and dry-strength additives are required in commercial paper, it is often necessary to use a dry-strength agent, such as a cationic starch, and a wet-strength resin. As a consequence of interaction between the resin and the cationic starch, the efficiency of both additives is significantly reduced.

In U.S. Pat. No. 3,763,060 (Hamerstrand et al.) is disclosed the wet-end addition to paper of interpolymers such as starch xanthate crosslinked with PAE resin, and U.S. Pat. No. 3,436,305 (Maher) teaches starch xanthate crosslinked with PEI. though these compositions are somewhat effective for the purpose of strengthening paper, they suffer from the disadvantages characteristic of the resinous components as described above.

Other additives have been designed which have bi- or mult-functional activity, such as dry-strength improvement and pigment or filler retention. Predominant in this field are the amphoteric strengthening agents such as the polysalt coacervates of U.S. Pat. No. 3,790,514 (Economou) and the polysaccharides having both cationic and anionic substituents. This latter group is the subject of U.S. Pat. Nos. 3,467,647 (Benninga), 3,459,632 (Caldwell et al.), 3,649,624 (Powers et al.), 3,793,310 (Elizer), and 3,562,103 (Moser et al.). Starch is the most commonly used backbone of these substituted polysaccharide compositions. The cationic groups are usually the tertiary and quaternary amines, and others such as sulfonium and phosphonium groups have also been used. Typical of the anionic substituents are phosphates, phosphonates, carboxylates, sulfates, and sulfonates. Though all of these amphoteric compositions have at least some degree of paper dry-strength properties, they have not been observed to impart to paper significant wet strength.

Certain polysaccharide xanthates, such as the ammonium cellulose xanthates of Bridgeford et al., U.S. Pat. No. 3,336,144, are known to impart wet strength to paper. Such additives have not been widely accepted in the paper industry because they operate in a relatively narrow pH range and have no effect on dry strength. When starch is substituted for cellulose as within the scope of Bridgeford and the resultant composition is used as a wet-end additive, no increase in wet strength is observed.

SUMMARY OF THE INVENTION

The primary objective of the present invention is to derive novel amphoteric starch-based wet-end additives, which can simply be admixed with papermaking furnish, and which will improve both wet and dry strength of paper on a cost/performance basis competitive with commercial systems.

Another important object of the invention is to provide wet-strength agents for paper that permit unusual ease of repulping.

It is also an object of the invention to prepare novel paper additives that are highly substantive to the pulp fibers, ecologically acceptable, and biodegradable.

A further object of the invention is to tailor the novel paper additives to be equally effective in acidic, neutral, and alkaline papermaking systems.

Other objects associated with the instant paper additives include their use as effective fiber flocculants for improving furnish freeness (drainage) and as pigment filler retention agents.

These and other advantages are accomplished by the provision of a novel class of amphoteric starch derivatives; namely, xanthated starch amines (XSA) characterized by the following general structure:

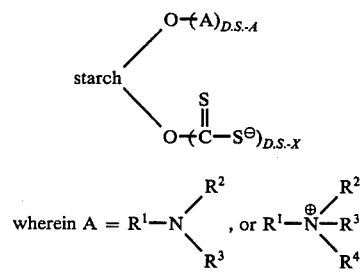

wherein $R^1$ is a $C_1$–$C_6$ alkylene or hydroxy-substituted alkylene; and $R^2$, $R^3$, and $R^4$ are each selected from the group consisting of hydrogen, $C_1$–$C_{12}$ straight or branched alkyl, cyclohexyl, phenyl, and benzyl;

wherein D.S.-A represents the degree of substitution of the amine group; and wherein D.S.-X represents the degree of substitution of the xanthate group.

As represented in the above formula, the XSA have the cationic amine groups and the anionic xanthate groups attached to the same starch backbone. These amphoteric starch derivatives can easily be tailored to a variety of conditions of use, particularly to the furnish pH, by varying the degrees of substitution of both the anionic and cationic substituents, by varying the cationic/anionic molar ratio, and by proper selection of the level of addition.

In view of the prior art discussed above, it is surprising that these xanthated starch amines improve dry strength of paper more than do the nonxanthated starch amines, and it is completely unexpected that they could also effect an increase in the wet strength of up to about 1000%.

DETAILED DESCRIPTION OF THE INVENTION

The amphoteric starch derivative paper additives of the instant invention are xanthated starch amines (XSA) having the following general structure:

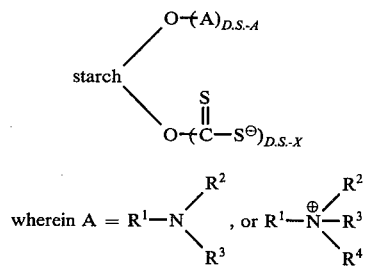

wherein $R^1$ is a $C_1$–$C_6$ alkylene or hydroxy-substituted alkylene; and $R^2$, $R^3$, and $R^4$ are each selected from the group consisting of hydrogen, $C_1$–$C_{12}$ straight or branched alkyl, cyclohexyl, phenyl, and benzyl;

wherein D.S.-A represents the degree of substitution of the amine group; and wherein D.S.-X represents the degree of substitution of the xanthate group.

In the preparation of the XSA, any starch material can be used whether it be granular, gelatinized, modified, or unmodified, provided that it has available reactive sites for etherification and xanthation of the starch backbone as described below. Exemplary starches are corn, wheat, rice, potato, tapioca, maize, and others as known to the skilled artisan. Alternatively, commercial cationic starches may be employed as the starting material wherein the cationic substituent corresponds to the substituent A as defined in the above structural formula.

The amine group A may be selected from primary, secondary, tertiary, and quaternary amines. The quaternary amines, of course, always carry a positive charge. The primary, secondary, and tertiary amines are neutral or positively charged as dependent upon the pH of the medium in which they are placed. The primary and secondary amines are less preferred for use in the invention. In the subsequent xanthation step as described below, primary and secondary amines are susceptible to a side reaction in which the amine hydrogens are displaced by the xanthate radicals, resulting in the dithiocarbamic acid salt. Tertiary and quaternary amines, which do not have free amine hydrogens available for this side reaction, are therefore preferred for use in the invention.

The amine is attached to the starch backbone through an ether linkage formed with a starch hydroxyl oxygen and the $R^1$ substituent. Though $R^1$, $R^2$, $R^3$, and $R^4$ may vary within the limits defined above, the shorter substituents are preferred. As the chain lengths increase, the solubility of the substituted starch decreases. Thus at high degrees of amine substitution onto the starch backbone, long-chained amines could reduce the operability of the XSA as a wet-end additive. Most preferred as cationic substitutents of XSA are diethylaminoethyl [—$CH_2CH_2N(C_2H_5)_2$] and 2-hydroxypropyltrimethylammonium [—$CH_2CHOHCH_2N^{\oplus}(CH_3)_3$] because of the commercial availability of the reagents from which they are provided and the ease of XSA preparation therewith. Examples 1A and 2A below illustrate the preferred method of preparing the cationic starch amines (SA). However, novelty of the invention does not lie in the method of preparing the SA. It is to be understood that SA in commercial use and those prepared by other methods known and described in the prior art are equivalent to those of Examples 1A and 2A for purposes of use within the instant invention.

The SA are converted to the XSA by reaction with carbon disulfide ($CS_2$). The ordinary procedures and conditions for xanthation of unmodified starch as known in the art are applicable for preparing the instant XSA compositions from SA, and are taught, for example, in Lancaster et al., "Xanthation of Starch in Low-Concentration Pastes," I+EC Prod. Res. Develop. 5:354 (December 1966), which is hereby incorporated by reference. Examples 1B and 2B below further illustrate the procedure, and it is understood that other equivalent methods of xanthation as known in the art could be used. The XSA may be stored either as a dispersion or as a dry solid.

The effectiveness of the instant XSA as paper strengthening agents is a function of the degree of substitution of the amine (D.S.-A) as well as the degree of substitution of the xanthate (D.S.-X). The following ranges pertain to both wet and dry strength, though wet strength is most sensitive to changes in D.S. The operable range of D.S.-A is from about 0.01 to about 0.35, beyond which little improvement of wet strength is observed. The preferred D.S.-A is from about 0.02 to about 0.11 with optimum results being obtained at about 0.06 for tertiary amines and about 0.07 for quaternary amines. The D.S.-X may vary from about 0.002 to about 0.35, with a preferred range of about 0.004 to about 0.11. As with the D.S.-A, optimum results in wet strength are with a D.S.-X of about 0.06 for tertiary amines and about 0.07 for quaternary amines.

The isoelectric points of the XSA are a function of the ratio of D.S.-A/D.S.-X (A/X). At a given A/X ratio, varying the degrees of substitution within the operable limits does not significantly raise the isoelectric point. Also, at a given A/X ratio, XSA with quaternary groups exhibited higher isoelectric point values than XSA with the tertiary amine groups. Thus, it would be advantageous to use XSA with quaternary groups in forming insoluble complexes under alkaline conditions. At optimum D.S.-A (0.06–0.07), optimum wet strengths are obtained when the isoelectric points of the XSA additives approach pH 7.0, which is when A/X is about 1:1. However, at the upper limit of D.S.-A (0.35), this ratio for optimum wet strength is about 3:1. Generally, XSA additives havin A/X ratios ranging from about 1:2.5 to about 5:1 and having isoelectric pH values in the range of about 4.5–10.5 have been found to result in improved paper wet strengths. At a given furnish pH value within the normal papermaking pH range of 4.5–8.0, the instant XSA additives in the isoelectric pH range of 4.5–10.5 all function substantially equally with respect to increasing wet strength. They perform best at a furnish pH of about 7. By proper tailoring of the D.S.-A and D.S.-X, the XSA additives can increase furnish paper strength at furnish pH's s as low as 4 and as high as 9. At pH's lower than 4, the xanthate moiety decomposes and releases $CS_2$.

The XSA additives of the instant invention are mixed with the pulp furnish in the same manner as commercial wet-end additives. For example, XSA in alkaline solution may be mixed into an unbleached, kraft, pulp furnish, and the pH of the treated furnish is then adjusted to near the XSA isoelectric point. Fiber flocculation, which is general, can be disrupted by high shear agitation without loss of XSA retention, thereby enhancing its effectiveness.

The level of XSA addition to the paper furnish for increasing both wet and dry strength is in the range of about 0.1 to about 10% (oven-dry pulp-weight basis). The preferred level is in the range of about 1 to about 2%, after which the point of diminishing returns is rapidly reached. At a given level of addition, the effectiveness of the XSA is a function of the specific amine substituent. For example, XSA with the quaternary amine substituent are slightly more effective than those with the tertiary amine.

Another factor influencing the XSA effectiveness on wet strength at a given level of addition is the method of drying. For example, it was found that XSA-treated handsheets oven dried at 105° C. for 30 minutes have wet strength values of approximately 20% greater than those that have been air dried for 24–48 hours at TAPPI Standard conditions (Tappi Standards and Provisional Methods, Technical Association of Pulp and Paper Industry). A similar increase is observed when XSA-treated papers are either cured at 105° C. for 30 minutes following air drying or stored about 1 year at TAPPI Standard conditions.

By proper selection of cationic amine substituent D.S.-A, D.S.-X, level of addition and pulp furnish pH improvements in paper wet strength of up to about 1000% can be obtained, as compared to paper without strengthening additives. Similarly, dry strength can be increased to unusual extents up to about 75%, and the burst factor about 100% over the untreated control paper strength. Actual values as compared to commercial and other prior art values are set forth in Table II below.

Under optimum conditions for wet strength development as defined above, XSA additives with D.S.-A from 0.035 to 0.11 are equally retained. These retentions, expressed as percent of XSA added, range from about 76 to 44% for addition levels from 1 to 5%, respectively. Corresponding values for cationic SA as taught in the prior art range from only 65 to 30%.

The instant XSA additives have been found to exhibit a combination of wet-strength permanency properties superior to the commercial wet-strength resins. As shown in Table I below, the wet-strength permanence is comparable to the commercial resins with respect to distilled or tap water. However, for purposes of repulpability, paper treated with 2% XSA lost wet strength under alkaline conditions much more readily than papers treated with 1% of urea-formaldehyde resin, 1% melamine-formaldehyde resin, or 0.5% polyamide-polyamine-epichlorohydrin. Only the urea-formaldehyde resin lost wet strength as readily as XSA but under corrosive acidic conditions.

While not desiring to be bound to any particular theory, it is proposed that XSA contribute to the strength of paper as a result of crosslinking between cationic nitrogen groups and anionic xanthate groups,

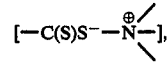

of the XSA complex, intimately sorbed into and around interfiber bonding areas. However, previous studies have revealed that when xanthates per se, such as sodium ethyl xanthate and sodium starch xanthate, are heated at 100° C. or above, carbonyl sulfide (COS) as well as $CS_2$ is released. The evolution of COS from xanthates under paper drying conditions suggests that secondary rearrangement reactions could contribute to wet strength of XSA-treated paper. Evidence of superior enhancement of interfiber bonding as well as higher retention of XSA accounts for superior dry-strength improvement imparted by XSA over SA.

Other conventionally used paper additives may be employed in combination with the XSA additives of the present invention. Included in the group are binders, pigments, fillers, dispersants, preservatives, defoamers, coating agents, sizing agents, and the like.

The XSA are effective as pigment filler retention agents and also as fiber flocculants for improving furnish freeness (drainage).

The following examples are intended only to further illustrate the invention and are not intended to limit the scope of the invention which is defined by the claims.

EXAMPLE 1

A. Preparation of tertiary starch amine (diethylaminoethyl derivative)

To 32.0 g. (oven-dried basis) of unmodified pearl corn starch in a 3-necked round-bottomed flask equipped with stirrer, condenser, and thermometer was admixed (1) 46 ml. distilled $H_2O$, (2) 12 g. $Na_2SO_4$, (3) 5 ml. 10% NaOH, and (4) 0.69 g. 2-chlorotriethylamine hydrochloride dissolved in 10 ml. $H_2O$. The mixture was heated at 55° C. for 6 hours, cooled to 25° C., and allowed to stand overnight before isolation of the product. By centrifugation-decantation procedures, the product was washed four times (each with 200 ml. $H_2O$), filtered, and washed successively with ethanol, hexane, and ether. The product contained 0.20% nitrogen, corresponding to an amine D.S. of 0.023.

Starch amines having different D.S.-A as used in the Examples below were similarly prepared by appropriately altering the proportion of materials in the reaction mixture. The exemplified procedure was followed throughout, except that for D.S.-A greater than about 0.07, the SA were too swollen to be washed by centrifugation-decantation or by filtration procedures, and were therefore dialyzed and then precipitated in ethanol.

B. Preparation of tertiary XSA

The tertiary SA (2.5 g. oven-dried basis) of Example 1A was (1) slurried in 28 ml. $H_2O$ plus 5 ml. 5% NaOH, (2) heated to 50° C. for 10 minutes, (3) cooled to 25°–35° C., and (4) xanthated by pipetting $CS_2$ (ranging in amounts from 0.01 ml. to 0.2 ml. for xanthate D.S. from 0.006 to 0.092) beneath the surface of the SA dispersion.

After 1 hour, the XSA dispersion was diluted to 5% concentration and stored 16 hours at 34° C. before analyses and evaluation of XSA as a paper-handsheet additive. The UV monitoring of portions of the XSA dispersion (diluted in 0.1N NaOH) showed that xanthation was 90% or more complete within 1hour after $CS_2$ addition.

EXAMPLE 2

A. Preparation of quaternary starch amine (2-hydroxypropyltrimethylammonium derivative)

To 32.0 g. (oven-dried basis) of unmodified pearl corn starch in a 3-necked round-bottomed flask equipped with stirrer, condenser, and thermometer was admixed (1) 37 ml. distilled $H_2O$, (2) 12 g. $Na_2SO_4$, (3) 14 ml. 10% NaOH, and (4) 4.1 g. 3-chloro-2-hydroxypropyltrimethylammonium chloride dissolved in 10 ml. $H_2O$. The mixture was heated at 55° C. for 6 hours, cooled to 25° C., and allowed to stand overnight before isolation of the product. The product was then dialyzed and precipitated in ethanol. The product contained 0.60% nitrogen, corresponding to an amine D.S. of 0.072.

B. Preparation of quaternary XSA

The quaternary SA of Example 2A was xanthated according to the procedure of Example 1B.

EXAMPLES 3–54

In Examples 3–54, paper handsheets were prepared containing various paper additives according to the following procedure: To a 1750 g. pulp slurry (15.0 g., oven-dried basis, of unbleached kraft pulp in tap water—560 ml. Canadian Standard freeness), under good agitation, was added 45 ml. of 1.0% additive dispersion in about 1 minute. After 2 additional minutes of mixing, pH of the treated furnish was adjusted to near the product's isoelectric point with $H_2SO_4$ (10% v/v). Then, the furnish was diluted with tap water to 0.24% consistency, and 1.2-g. (60 g./m.$^2$) handsheets were prepared and tested according to TAPPI Standard Methods—except that wet-tensile test strips were soaked 30 minutes (distilled $H_2O$). A description of the additives and the strength properties of the resultant handsheets are set forth in Table II below.

It is to be understood that the foregoing detailed description is given by way of illustration and that modification and variations may be made therein without departing from the spirit and scope of the invention.

Table I.

| Wet-Strength Permanency of Paper Treated with Xanthated Starch Amine (XSA) and Commercial Resins | | | | |
|---|---|---|---|---|
| Addition level based on oven-dry pulp basis, % | Temperature of solution, °C. | Wet breaking length of paper soaked for 30 min., m. | | |
| | | Distilled $H_2O$ | 0.025N NaOH | 0.025N $H_2SO_4$ |
| XSA[1] | | | | |
| 2.0 | 23 | 1880 | — | 1850 |
| 2.0 | 60 | 1850 | 540 | 1850 |
| 2.0 | 60 | 1850 | 540 | 1850 |
| 2.0 | 83 | 1750 | 250 | 1610 |
| 2.0 | 93 | 1670 | 250 | — |
| Urea-Formaldehyde Resin[2] | | | | |
| 1.0 | 23 | 2200 | 2150 | 1270 |
| 1.0 | 83 | 2170 | 710 | 250 |
| 1.0 | 93 | 1650 | 530 | 250 |
| Melamine-Formaldehyde Resin[2] | | | | |
| 1.0 | 23 | 1570 | 1550 | 1440 |
| 1.0 | 93 | 1260 | 1330 | 610 |
| Polyamide-Polyamine-Epichlorohydrin Resin[2] | | | | |
| 0.5 | 23 | 2120 | 1710 | 2150 |
| 0.5 | 93 | 2000 | 1520 | 1980 |

[1]D.S. 0.072 quaternary ammonium, 0.065 xanthate. Paper was dried at TAPPI Standard conditions. Tensile values were essentially unchanged when soaked from 5 min. to 48 hr. in tap water.
[2]Resin-treated papers were oven cured aat 105° C. for 30 min.

Table II

| Example | Additive[1] | % Addition | Degree of substitution | | pH | | Burst factor (g./cm.$^2$)/(g./m.$^2$) | Tensile strength breaking length (m.) | |
|---|---|---|---|---|---|---|---|---|---|
| | | | Cation | Anion | Isoelectric point | Pulp furnish | | Wet | Dry |
| Controls: | | | | | | | | | |
| 3 | None | — | — | — | — | 5.5 | 45 | 200 | 6870 |
| 4 | None | — | — | — | — | 7.0 | 44 | 200 | 6800 |
| Commercial wet strength agents: | | | | | | | | | |
| 5 | MF resin | 0.5 | — | — | — | — | 50 | 940 | 7710 |
| 6 | PAE | 0.5 | — | — | — | — | 55 | 2120 | 8340 |
| Prior art starch amines: | | | | | | | | | |
| 7 | Tert. SA | 1 | 0.023 | — | — | 5.5 | 62 | 221 | 8737 |
| 8 | Tert. SA | 3 | 0.023 | — | — | 7.0 | 66 | 200 | 9300 |
| 9 | Tert. SA | 5 | 0.023 | — | — | 5.5 | 73 | 250 | 9922 |
| 10 | Tert. SA | 1 | 0.078 | — | — | 5.5 | 61 | 219 | 8530 |
| 11 | Tert. SA | 5 | 0.078 | — | — | 5.5 | 74 | 254 | 9846 |
| 12 | Tert. SA | 3 | 0.037 | — | — | 7.0 | 70 | 200 | 9600 |
| 13 | Tert. SA | 3 | 0.06 | — | — | 7.0 | 68 | 200 | 9300 |
| 14 | Tert. SA | 3 | 0.11 | — | — | 7.0 | 68 | 225 | 9120 |
| 15 | Quat. SA | 2 | 0.072 | — | — | 7.0 | 67 | 220 | 9490 |
| 16 | Quat. SA | 3 | 0.072 | — | — | 7.0 | 70 | 225 | 9632 |

Commercial wet-strength agents

Table II-continued

| Example | Additive[1] | % Addition | Degree of substitution Cation | Degree of substitution Anion | pH Isoelectric point | pH Pulp furnish | Burst factor (g./cm.²)/(g./m.²) | Tensile strength breaking length (m.) Wet | Tensile strength breaking length (m.) Dry |
|---|---|---|---|---|---|---|---|---|---|
| plus prior art starch amines: | | | | | | | | | |
| 17 | MF resin + quat. SA | 0.5, 2.0 | 0.072 | — | — | — | 71 | 990 | 9670 |
| 18 | PAE + quat. SA | 0.5, 2.0 | 0.072 | — | — | — | 64 | 1969 | 9090 |
| Prior art starch xanthates: | | | | | | | | | |
| 19 | Starch xanthate | 3 | — | 0.05 | — | 7.0 | 44 | 158 | 7448 |
| 20 | Starch xanthate | 3 | — | 0.05 | — | 5.0 | 44 | 131 | 7262 |
| Prior art amphoteric starch derivatives: | | | | | | | | | |
| 21 | Quat. SA sulfate | 3 | 0.030 | 0.027 | 6.6 | 7.0 | 57 | 150 | 8299 |
| 22 | Quat. SA sulfate | 3 | 0.071 | 0.064 | 9.3 | 7.0 | 62 | 221 | 8498 |
| 23 | Quat. SA carboxylate | 3 | 0.07 | 0.065 | 10.5 | 7.0 | 62 | 157 | 8891 |
| 24 | Quat. SA carboxylate | 3 | 0.07 | 0.094 | 3.9 | 7.0 | 53 | 134 | 8159 |
| 25 | Quat. SA carboxylate | 3 | 0.07 | 0.128 | 3.6 | 7.0 | 48 | 140 | 7702 |
| 26 | Quat. SA carboxylate | 3 | 0.039 | 0.029 | 10.4 | 7.0 | 67 | 174 | 9160 |
| 27 | Quat. SA carboxylate | 3 | 0.039 | 0.037 | 7.5 | 7.0 | 63 | 167 | 8800 |
| 28 | Quat. SA carboxylate | 3 | 0.039 | 0.041 | 4.5 | 7.0 | 62 | 161 | 8068 |
| 29 | Quat. SA carboxylate | 0.5 | 0.032 | 0.029 | 10.4 | 7.0 | 50 | 166 | 7724 |
| 30 | Quat. SA carboxylate | 3.0 | 0.032 | 0.029 | 10.4 | 7.0 | 63 | 176 | 8779 |
| 31 | Quat. SA phosphate | 0.5 | 0.074 | 0.042 | 7.5 | 7.0 | 48 | 165 | 7567 |
| 32 | Quat. SA phosphate | 3.0 | 0.074 | 0.042 | 7.5 | 7.0 | 66 | 196 | 9497 |
| Xanthated starch amines: | | | | | | | | | |
| 33 | Tert. XSA | 1 | 0.023 | 0.010 | 8.3 | 5.5 | 69 | 395 | 9551 |
| 34 | Tert. XSA | 1 | 0.023 | 0.020 | 5.1 | 5.5 | 66 | 486 | 9065 |
| 35 | Tert. XSA | 3 | 0.023 | 0.020 | 5.1 | 7.0 | 78 | 700 | 10150 |
| 36 | Tert. XSA | 3 | 0.023 | 0.055 | <3.5 | 7.0 | 61 | 280 | 8555 |
| 37 | Tert. XSA | 5 | 0.023 | 0.020 | 5.1 | 5.5 | 80 | 735 | 10444 |
| 38 | Tert. XSA | 2 | 0.037 | 0.020 | 6.4 | 7.0 | 77 | 1074 | 10419 |
| 39 | Tert. XSA | 3 | 0.037 | 0.006 | 9.5 | 7.0 | 79 | 657 | 10759 |
| 40 | Tert. XSA | 3 | 0.037 | 0.020 | 6.4 | 7.0 | 79 | 1100 | 10895 |
| 41 | Tert. XSA | 3 | 0.037 | 0.060 | <4 | 7.0 | 70 | 720 | 9903 |
| 42 | Tert. XSA | 2 | 0.06 | 0.032 | 9.6 | 7.0 | 79 | 1057 | 10776 |
| 43 | Tert. XSA | 2 | 0.06 | 0.092 | <4 | 7.0 | 70 | 770 | 9577 |
| 44 | Tert. XSA | 3 | 0.06 | 0.060 | 5.6 | 7.0 | 82 | 1258 | 10031 |
| 45 | Tert. XSA | 2 | 0.11 | 0.054 | 7.7 | 7.0 | 86 | 1166 | 10588 |
| 46 | Tert. XSA | 3 | 0.11 | 0.054 | 7.7 | 7.0 | 79 | 1323 | 10403 |
| 47 | Tert. XSA | 5 | 0.11 | 0.054 | 7.7 | 7.0 | 89 | 1453 | 11849 |
| 48 | Quat. XSA | 2 | 0.072 | 0.065 | 5.3 | 7.0 | 78 | 1610 | 10531 |
| 49 | Quat. XSA | 3 | 0.072 | 0.046 | 10.0 | 7.0 | 83 | 1450 | 10881 |
| 50 | Quat. XSA | 3 | 0.072 | 0.065 | 5.3 | 7.0 | 85 | 1940 | 10970 |
| 51 | Quat. XSA | 3 | 0.072 | 0.082 | <4.5 | 7.0 | 80 | 1433 | 10737 |
| 52 | Quat. XSA | 5 | 0.072 | 0.065 | 5.3 | 7.0 | 89 | 2268 | 11429 |
| 53 | Tert. XSA[2] | 3 | 0.11 | trace | none | 7.0 | 70 | 285 | 9525 |
| 54 | Tert. XSA[3] | 3 | 0.11 | 0.057 | 7.1 | 7.0 | 76 | 1331 | 10758 |

[1]MF = melamine-formaldehyde; PAE = polyamide-polyamine-epichlorohydrin resin; quat. = quaternary ammonium [—$CH_2CHOHCH_2N^{\oplus}(CH_3)_3$]; Tert. = tertiary amino [—$CH_2CH_2N(C_2H_5)_2$]; SA = starch amine; XSA = xanthated starch amine.
[2]Acid-treated (pH 2) freeze-dried XSA.
[3]Freeze-dried XSA stored 49 days at 1° C.

I claim:

1. Compositions for use in increasing the wet and dry strength of paper comprising xanthated starch amines (XSA) characterized by the following general structure:

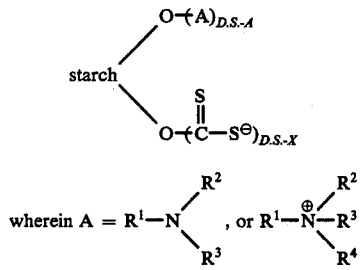

wherein A = $R^1$—N with $R^2$, $R^3$, or $R^1$—$\overset{\oplus}{N}$—$R^3$ with $R^2$, $R^4$ wherein $R^1$ is a $C_1$–$C_6$ alkylene or hydroxy-substituted alkylene; and $R^2$, $R^3$, and $R^4$ are each selected from the group consisting of hydrogen, $C_1$–$C_{12}$ straight or branched alkyl, cyclohexyl, phenyl, and benzyl; wherein D.S.-A represents the degree of substitution of the amine group; and wherein D.S.-X represents the degree of substitution of the xanthate group.

2. The compositions as described in claim 1 wherein D.S.-A is in the range of from about 0.01 to about 0.35 and D.S.-X is in the range of from about 0.002 to about 0.35.

3. The compositions as described in claim 1 wherein the ratio of D.S.-A/D.S.-X is about 1:1.

4. The compositions as described in claim 1 wherein A = —$CH_2CH_2N(C_2H_5)_2$.

5. The composition as described in claim 4 wherein both D.S.-A and D.S.-X are about 0.06.

6. The compositions as described in claim 1 wherein A = —$CH_2CHOHCH_2N^{\oplus}(CH_3)_3$.

7. The compositions as described in claim 6 wherein both D.S.-A and D.S.-X are about 0.07.

8. A method of increasing the wet and dry strength of a paper product comprising adding to the pulp furnish as a wet-end additive in a papermaking process an effective amount of a xanthated starch amine (XSA) characterized by the following general structure:

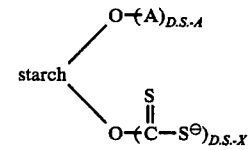

-continued

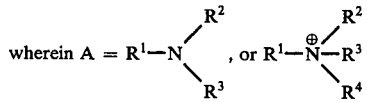

wherein $R^1$ is a $C_1$-$C_6$ alkylene or hydroxy-substituted alkylene; and $R^2$, $R^3$, and $R^4$ are each selected from the group consisting of hydrogen, $C_1$-$C_{12}$ straight or branched alkyl, cyclohexyl, phenyl, and benzyl;

wherein D.S.-A represents the degree of substitution of the amine group; and wherein D.S.-X represents the degree of substitution of the xanthate group.

9. The method as described in claim 8 wherein D.S.-A is in the range of from about 0.01 to about 0.35 and D.S.-X is in the range of from about 0.002 to about 0.35.

10. The method as described in claim 8 wherein the ratio of D.S.-A/D.S.-X is about 1:1.

11. The method as described in claim 8 wherein A = $-CH_2CH_2N(C_2H_5)_2$.

12. The method as described in claim 11 wherein both D.S.-A and D.S.-X are about 0.06.

13. The method as described in claim 8 wherein A = $-CH_2CHOHCH_2N^{\oplus}(CH_3)_3$.

14. The method as described in claim 13 wherein both D.S.-A and D.S.-X are about 0.07.

15. The method as described in claim 8 wherein said effective amount is in the range of about 0.1 to about 10% (oven-dry pulp-weight basis).

16. The method as described in claim 8 wherein said effective amount is in the range of about 1 to about 2% (oven-dry pulp-weight basis).

17. The method as described in claim 8 wherein said pulp furnish is in the pH range of 4-9.

* * * * *